United States Patent [19]

Montanari

[11] Patent Number: 5,050,927
[45] Date of Patent: Sep. 24, 1991

[54] EXPANSIBLE MOTOR HOME

[76] Inventor: Verne Montanari, 208 Nassau Dr., Pittsburgh, Pa. 15239

[21] Appl. No.: 577,193

[22] Filed: Sep. 4, 1990

[51] Int. Cl.$^5$ ............................................. B60P 3/34
[52] U.S. Cl. .................................. 296/165; 296/170; 296/175; 296/176
[58] Field of Search ................. 296/26, 156, 164, 165, 296/167, 168, 170, 171, 172, 175, 176

[56] References Cited

U.S. PATENT DOCUMENTS

| | | | |
|---|---|---|---|
| 2,995,398 | 8/1961 | Davenport | 296/26 |
| 3,106,750 | 10/1963 | Jarman | 296/26 X |
| 3,288,518 | 11/1966 | Oliver | 296/164 |
| 3,740,088 | 6/1973 | Ratcliff | 296/26 X |
| 3,888,539 | 6/1975 | Niessner | 296/156 |
| 4,049,310 | 9/1977 | Yoder | 296/26 |
| 4,133,571 | 1/1979 | Fillios | 296/165 |
| 4,500,132 | 2/1985 | Yoder | 296/171 |

Primary Examiner—Margaret A. Focarino
Assistant Examiner—Andrew C. Pike
Attorney, Agent, or Firm—William J. Ruano

[57] ABSTRACT

A motor home has a rear, extensible room portion that does not require ground support. The extensible room portion comprises a rear wall, roof portion, and a pair of sidewalls having integral top extensions extending over 40% forwardly of the extensible room portion and serving as lever arms. The end of each lever arm has rollers which roll on upper tracks below the roof of the vehicle while the side wall portions roll on tracks at the base of the sidewalls, either of which work in conjunction with fulcrum rollers in shifting and distributing its weight while extending or retracting the extensible unit, whereby the overhanging extensible room portion can be partially extended to a balance point, and will exactly balance, whereby the overhanging weight of the rear portion of the extensible room portion when moved outwardly of the balance point will be resisted solely by the resistance of the tracks on which the upper rollers roll so as to distribute the overhanging weight along two upper tracks and greatly facilitate extending or retracting movements of the extensible room portion.

2 Claims, 6 Drawing Sheets

5,050,927

EXPANSIBLE MOTOR HOME

BACKGROUND OF THE INVENTION

This invention relates to motor home self propelled vehicles and recreational vehicles and an improvement in expansible units therein which will provide a long rear expansion without the necessity of ground support.

In the past, sidewall expansions, expanding outwardly from within a side portion of the vehicle wall have been accepted and are being expanded upon. The apparent advantages of applicant's rearwall expansions over common sidewall expansions have not yet been perceived, although applicable also to sidewall expansions.

Expansible units, when being larger, installed and expanded upon as a large rear overhanging load will better serve, level and balance itself, and show less strain on the vehicle frame and its suspension by advantageously using the long length and weight of the vehicle body and chassis in distributing its expanding weight upon and in line with the equalized strength of both frame rails and both rear spring suspensions of the vehicle, as opposed to upon and across the short side and only one frame rail and one spring suspension of the vehicle.

The hazards of turning corners and pulling away from gasoline pumps and curbs alone justify a means to provide an incentive for limiting long overhangs, when notably the lengthy loss of the floor space of the vehicle needed mainly when parked, can be recouped by an expansible section extended outwardly of and from within the rear wall section of the vehicle.

SUMMARY OF THE INVENTION

An object of the invention is to construct the operational mechanism and the expansible unit rearwardly as to not interfere with the activies of the users or the floor plan of the vehicle. The floor of the expansible unit is installed as a stationary or as a fold-away floor according to the floor plan of the vehicle. The framework of the expansible unit is balanced on a fulcrum when in a partly extended position. An operating mechanism is used to completely eliminate any rear support or stabilizing systems beyond the point of overbalance.

DETAILED DESCRIPTION OF THE PREFERRED EMBODIMENT

Figure 1:
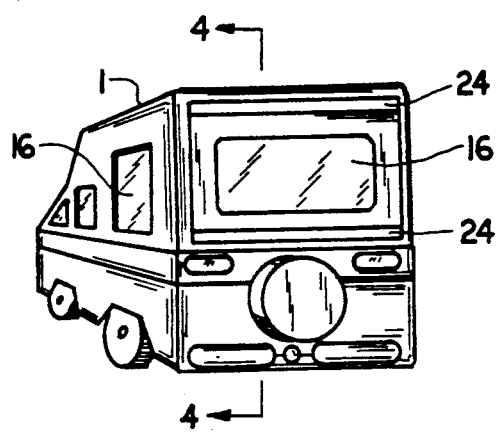
FIG. 1 is a rear perspective view of a vehicle, such as a motor home having its rear expansible section in the closed portion.
Figure 2:
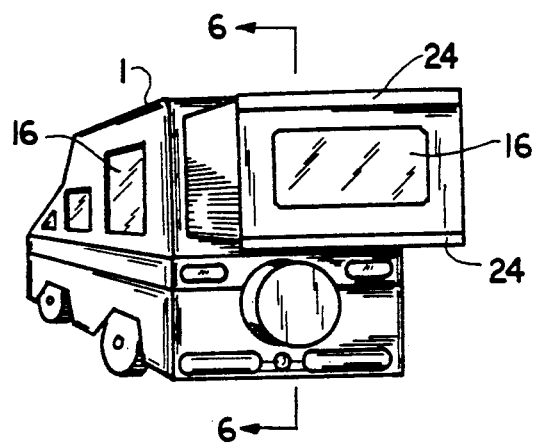
FIG. 2 is a view similar to FIG. 1 but showing the rear expansible section in the open position.
Figure 4:
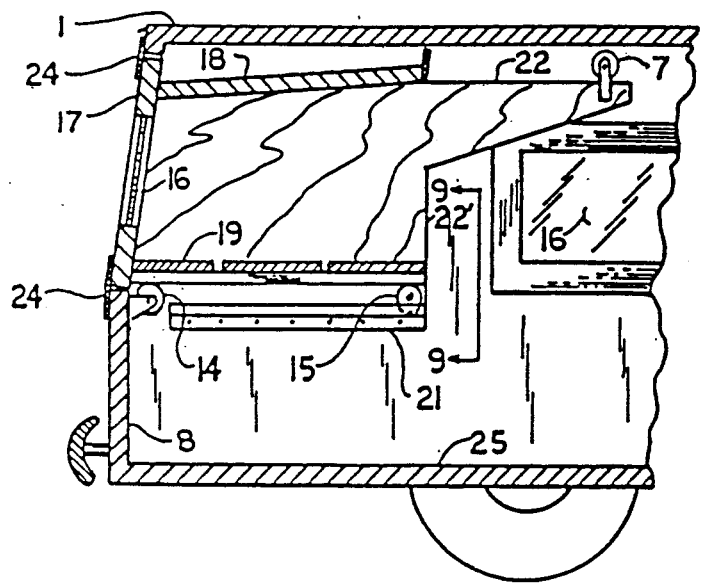
FIG. 4 is a partial, longitudinal cross-sectional view taken along line 4—4 of FIG. 1.
Figure 5:
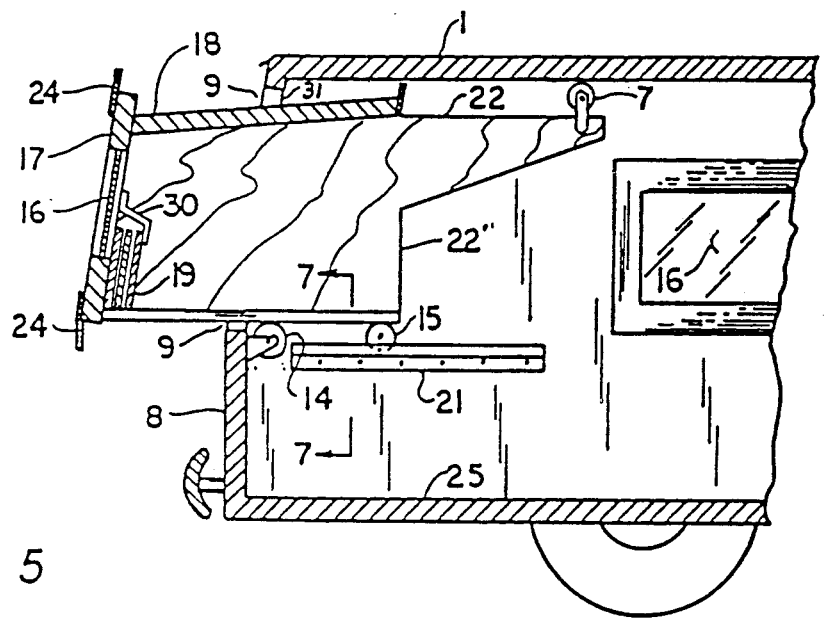
FIG. 5 is a view similar to FIG. 4 except showing the rear expansion unit partially open.

FIGS. 1 and 4 show a motor homehaving side windows 16, with its rear extensible section in the closed position and FIGS. 2 and 5 show it in an extended, balanced position and will be explained more fully hereinafter. When in the closed position, weather strip aluminum and felt seal 24 will seal the extensible unit from rain or snow.

Figure 3:
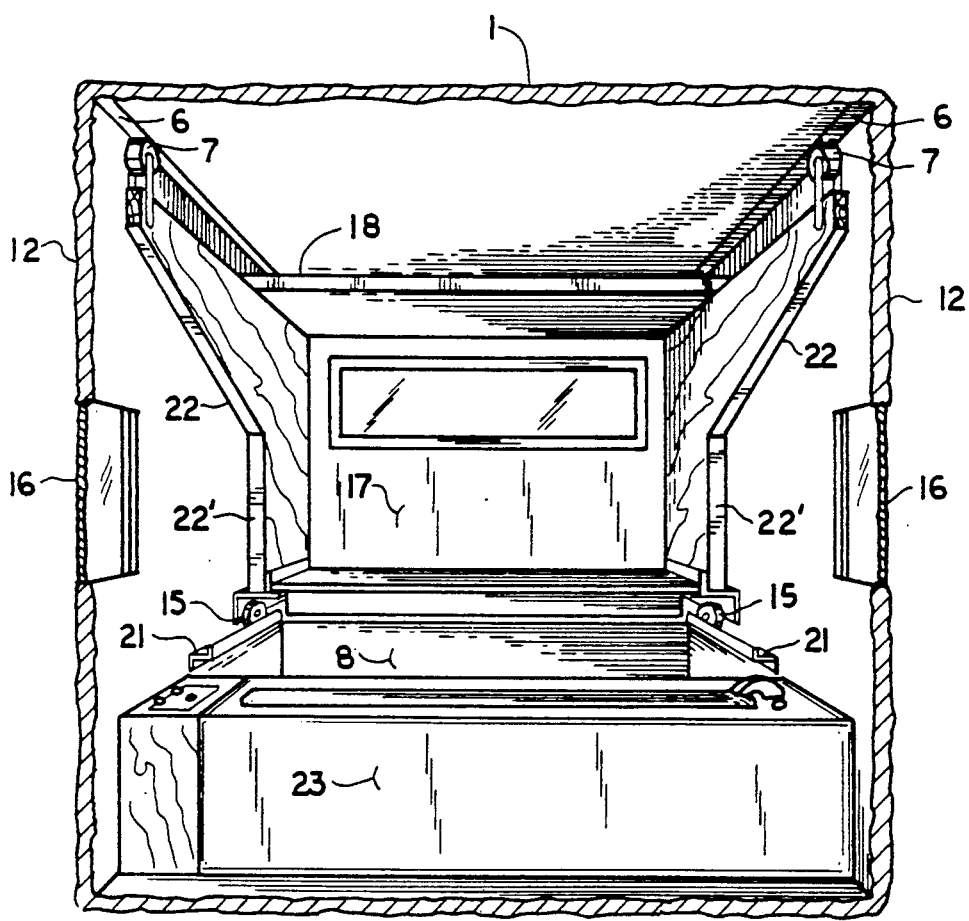
FIG. 3 is an interior sectional view taken from the front of the vehicle.

FIG. 3 shows body 1 having a pair of metallic tracks 6, 6 underneath the corner portions of the roof. Rollers 7 attached to the ends of lever arms 22 roll on tracks 6, 6. Lower rollers 15, 15 roll on flanged metallic tracks 21, 21 located above bathtub 23. Lever arms 22 are an integral part of sidewalls $22^1$.

Figure 6:
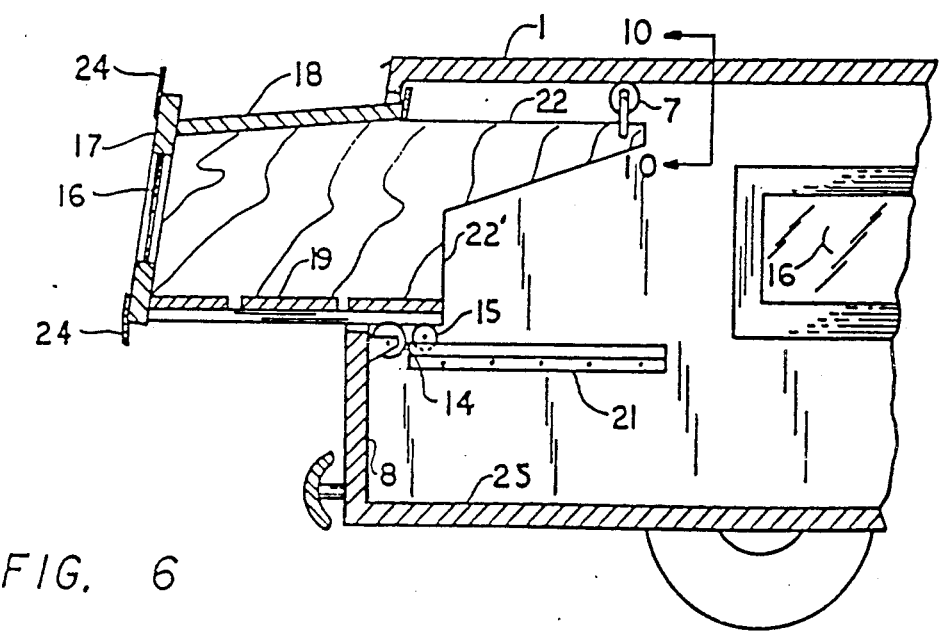
FIG. 6 is a partial, longitudinal view taken along line 6—6 of FIG. 2.

FIGS. 4, 5 and 6 show the extensible rear portion of the motor home in its closed, partly open and balanced position, and fully open position, respectively. FIG. 4 shows collapsible floor 19 in its laid position and FIG. 5 shows it in the collapsed position held by bracket 30 to make the bathtub accessible.

An important feature of the invention is the framework construction of the sidewalls that roll on rollers 7, 7 on tracks 6, 6 and 15, 15 on tracks 21, 21. Lever arms 22, 22 will extend at least 40% of the length of the extensible side panels to provide lever arms that counter-balance the weight of the rear extension and its roof portion 18.

More specifically, rollers 14, 14 mounted on rear wall 8 serve as fulcrums for the extensible framework. FIG. 5 shows the balanced position wherein the weight of the extensible unit to the right of fulcrum rollers 14, 14 equals the weight thereof to the left of the extensible unit so that no weight is borne by rollers 15, 15, or 7, 7. In short, the moment arm provided by lever arms 22 provides a resistive force on rollers 7, 7 exerted on tracks 6, 6 and the roof which will exactly counterbalance the weight of the extensible unit to the left of fulcrum rollers 14, 14 and beyond the space 9 above the lower rear wall 8 of the vehicle. From the balanced position, very little resistance is provided by rollers 7, 7 in extending the extensible unit and very little force is exerted on rollers 15, 15 in retracting it from the balanced position. Thus the extensible unit can be easily pushed rearwardly from inside or outside the motor-home from the position shown in FIG. 4 to the fully open position shown in FIG. 6 and stabilized without the necessity of support on the ground. Of course, the longer the lever arms 22, 22, the greater will be the resistive force exerted by rollers 7, 7 on the tracks 6, 6 to accommodate greater loads of the extensible unit. Rollers 14 serve as limit stops to outward movement of rollers 15.

Expansible units, when being built larger, installed and expanded upon as a large rear overhanging load will better serve, level and balance itself, and show less strain on the vehicle frame and its suspension by advantageously using the long length and weight of the vehicle body and chassis in distributing its expanding weight upon and in line with the equalized strength of both frame rails and both rear spring suspensions of the vehicle, as opposed to upon and across the short side and only one frame rail and one spring suspension of the vehicle. Optimum benefits have thus been obtained by rear wall expansion.

Figure 7:
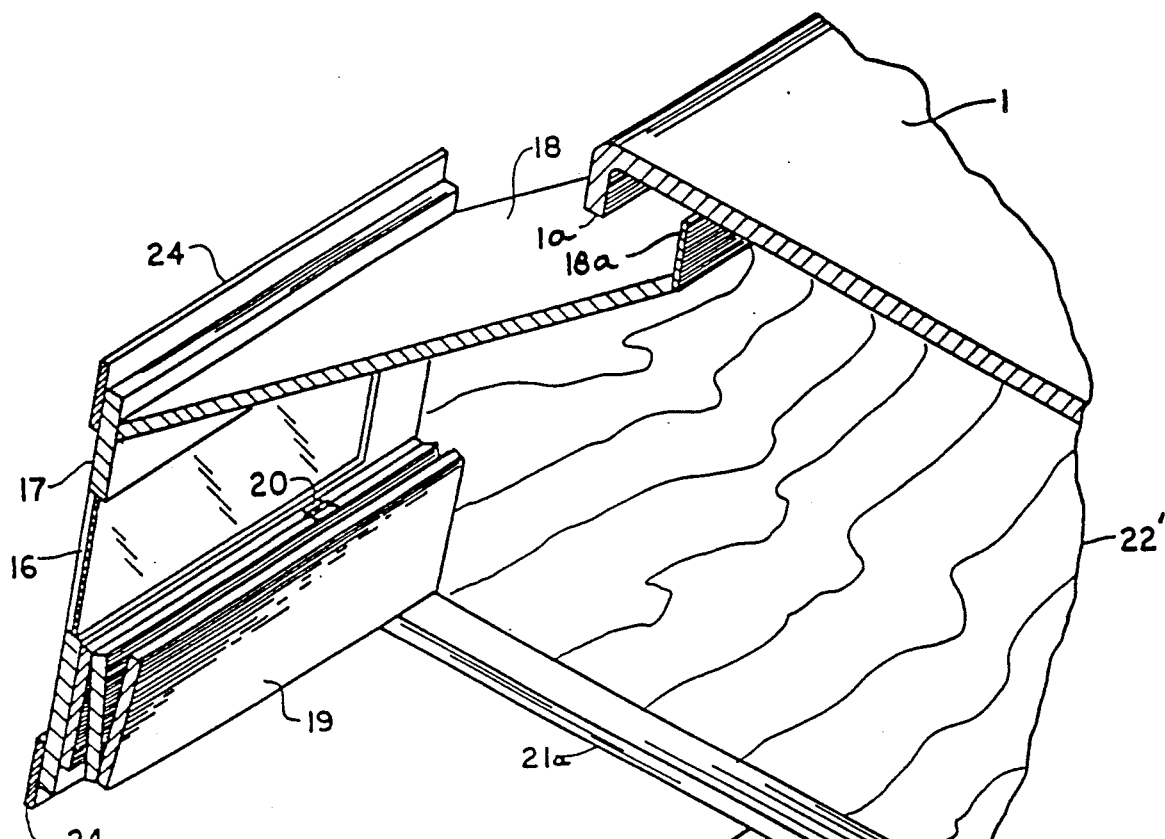
FIG. 7 is a top, perspective view of a corner portion of the vehicle showing the floor in folded position and the rear expansion unit partially open.
Figure 8:
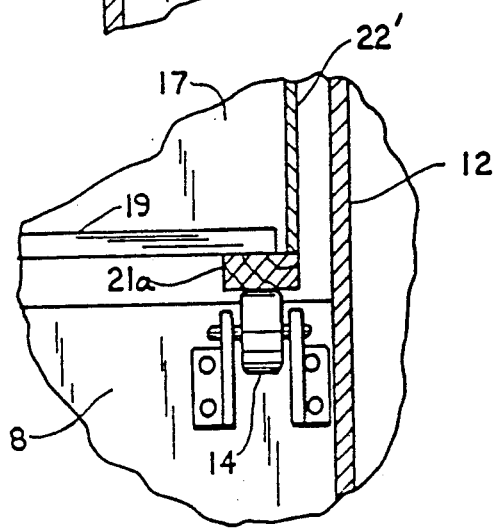
FIG. 8 is a fragmentary, cross-sectional view taken along line 8—8 of FIG. 7.

FIGS. 7 and 8 more clearly show the collapsible floor 19 with hinges 20 and the manner roof 1 with its stop portion 1a limits rearward movement of the top portion 18a of the extensible roof portion 18. Also it more clearly shows fulcrum roller 14 and seals 24. FIG. 8 shows fulcrum roller 14 mounting for supporting track 21a holding floor 19 adjacent outer wall 12 of the motorhome.

Figure 9:
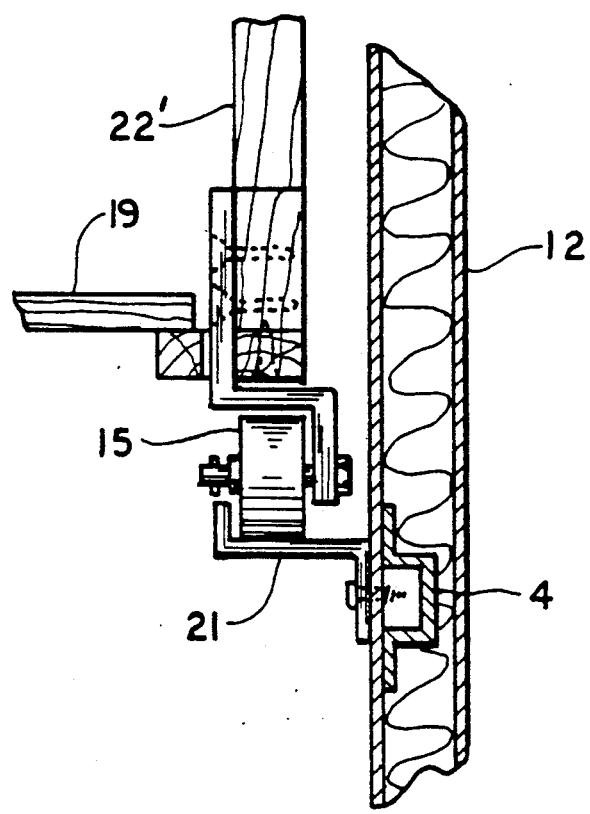
FIG. 9 is a fragmentary, cross sectional view, taken along line 9—9 of FIG. 4, of the bottom roller and track shown in FIG. 3.

FIG. 9 more clearly shows the lower rollers 15 and how they support the inner walls $22^1$ and how they are mounted on outer wall 12 reinforced by channel 4.

Figure 10:
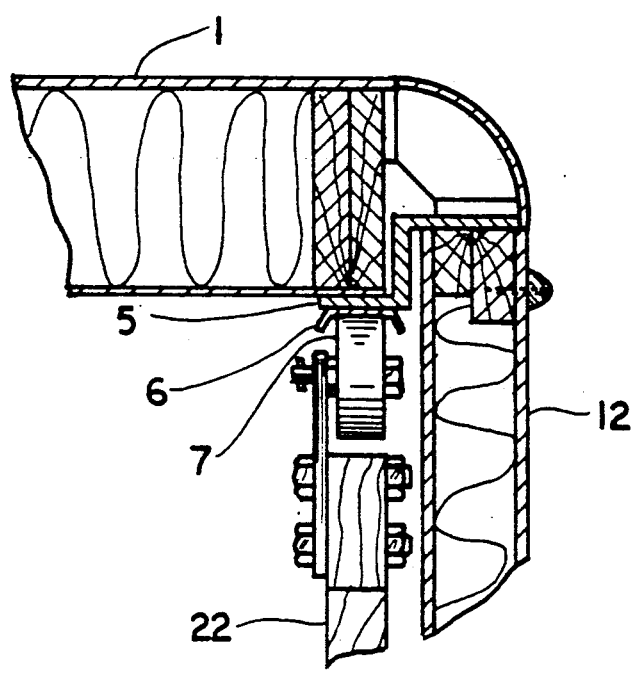
FIG. 10 is a fragmentary, cross-sectional view taken along line 10—10 of FIG. 6 of the top roller and track shown in FIG. 3.

FIG. 10 more clearly shows the upper rollers 7 rolling on track 6 supported by angle irons 5 mounted on outer wall 12.

Figure 11:
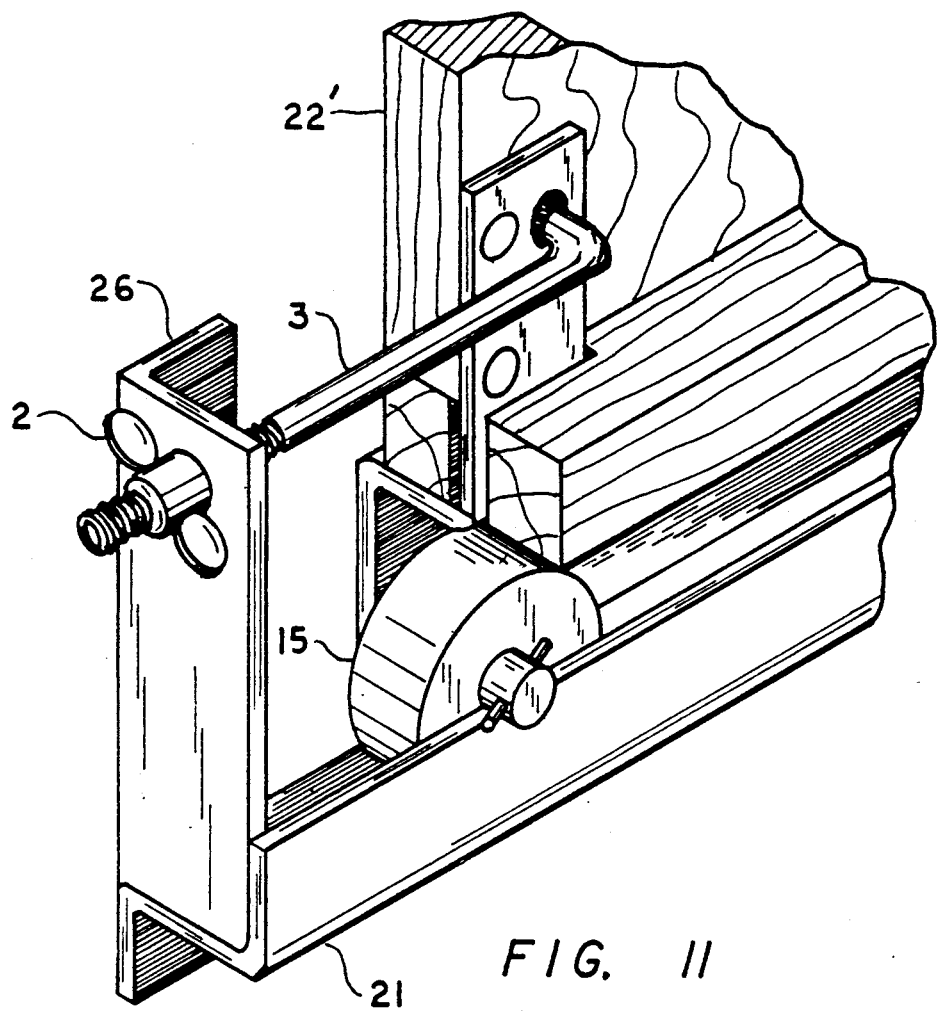
FIG. 11 is an enlarged, top perspective view of the bottom right wall of the expansible unit bottom roller 15 and bracket with a threaded bolt lock and mounting thereof, the bottom roller appearing in FIG. 3.

FIG. 11 is an enlarged perspective view of lower roller 15 and its mounting on track 21 supporting vertical angle iron 26 through which a threaded portion of rod 3 extends and is held by wingnut 2, which rod 3 is welded at the other end to an angle iron which is fastened to inner wall $22^1$, providing a secure lock.

Figure 12:
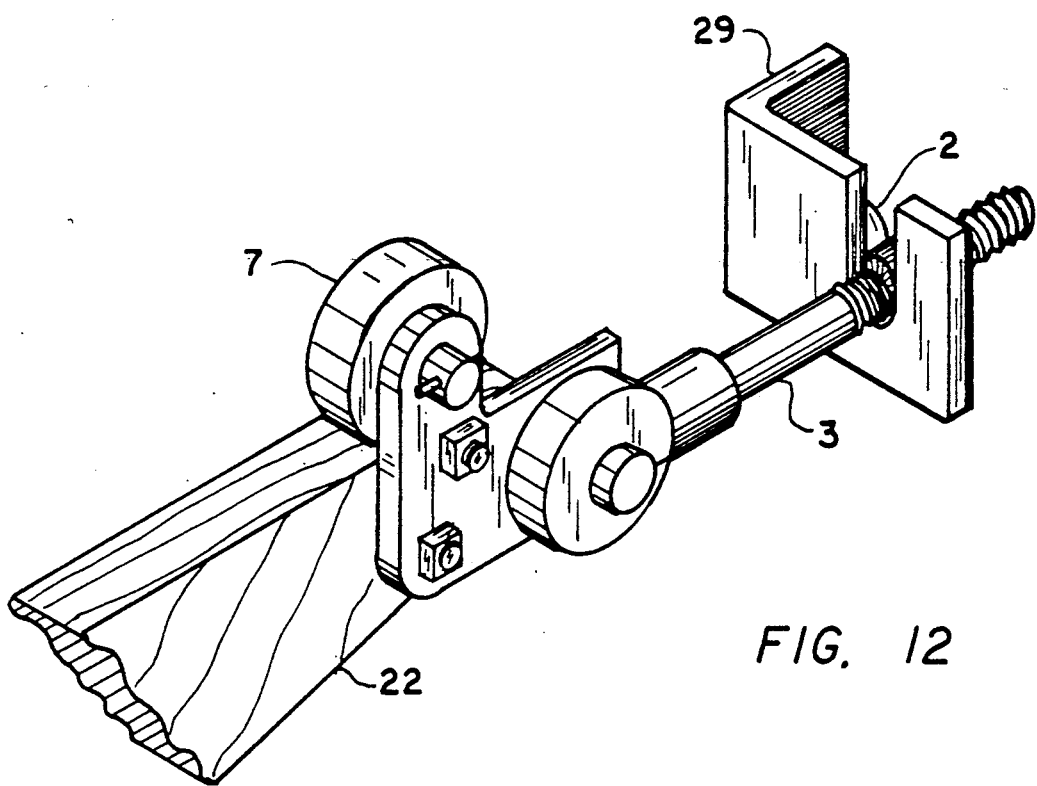
FIG. 12 is an enlarged, fragmentary, top perspective view of the left inside extended arm assembly with an eyebolt and wing locking device for the top roller 7 shown in FIG. 3.

FIG. 12 is an enlarged perspective view of the upper roller 7 showing how it is mounted and held by rod 3, by wing nut 2, on bracket 29, providing a secure end lock.

A bed, chest or other item may be substituted for the bath tub 23 (FIG. 3).

Figure 13:
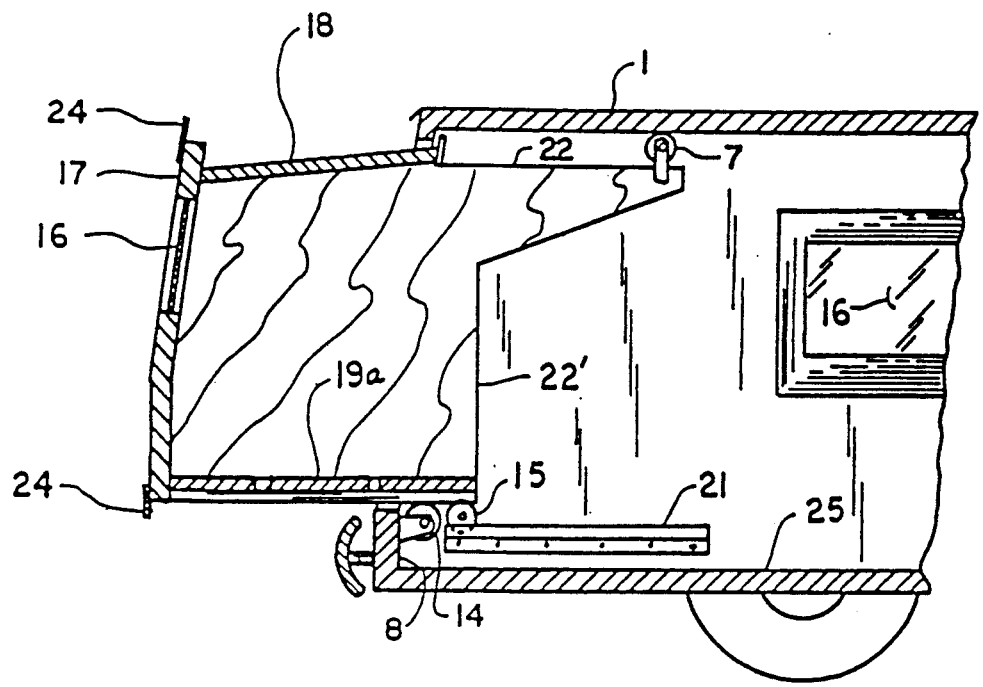
FIG. 13 is a cross-sectional view, taken along line 13—13 of FIG. 14 of a modification.

FIG. 13 shows a modification for providing more floor and walking space when the expansible unit is completely retracted, by the omission of the bathtub 23. This enables the sidewalls 22' to be of greater height and the use of a permanent floor 19a instead of a foldable floor and the positioning of tracks 21 secured directly on the floor 25 of the motor home. The level of floor 19a is above that of the floor of the motor home (as shown). This construction permits a shorter length motor home, which is less costly and more maneuverable, as well as more walking space and room in the motor home.

Figure 14:
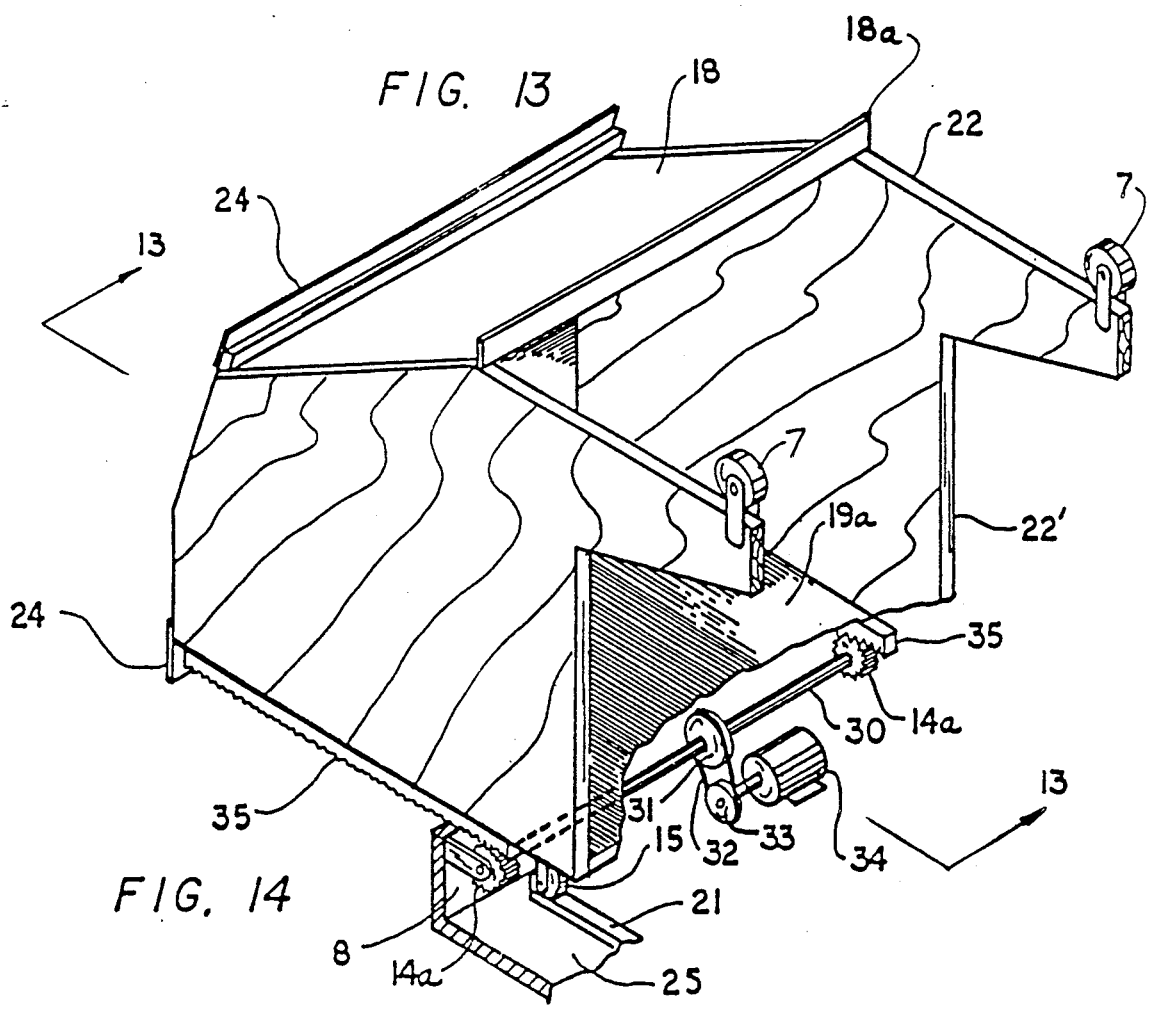
FIG. 14 is a top perspective view taken from the top of FIG. 13.

FIG. 14 shows a modification of the expansible unit to make it mechanically motor operated in either direction. This is done by substituting, for the smooth fulcrum rollers 14, rollers 14a which are splined gears permanently mounted on the ends of shaft 30 driven by pulley 31 having a belt 32 which drives pulley 33 driven by reversible motor 34.

Splined racks 35, matching the teeth of the fulcrum gears 14a, are mounted beneath the floor of the expansible unit. The fulcrum gears 14a, pulley 33 and shaft 30 all rotate on the same mounting brackets used for mounting the flat track rollers 14 of FIG. 13. The expansible unit is motor driven to extend it or retract it by advantageously using the free floating weight of the expansible unit, holding constant pressure against and meshing the splined rack 35 against splined fulcrum gear 14a.

While the reversible motor drive shown in FIG. 14 is shown applicable to the modification shown in FIG. 13, it is equally applicable to the construction shown in FIGS. 1 to 12 inclusive.

While I have illustrated and described several embodiments of my invention, it will be understood that these are by way of illustration only and that various changes and modifications are contemplated in my invention within the scope of the following claims:

I claim:

1. A motor home having a rear interior extensible portion, said rear extensible portion comprising sidewall portions, a rearwall portion, a roof portion, a floor portion, a pair of levers each comprising a lever arm integrally extending from a top portion of each sidewall portion, respectively, and integrally extending forwardly of a front edge of each sidewall portion, respectively, upper roller means secured to and extending above forward ends of said lever arms, and lower roller means underneath said floor portion, said motor home further having a roof, side walls, a rear wall, a pair of longitudinal upper rails which are attached to interior sides of said roof and engage said upper roller means, a pair of longitudinal lower rails beneath said floor portion which engage said lower roller means, and a pair of fulcrum rollers mounted on said rear wall of said motor home which engage said pair of longitudinal lower rails; whereby said rear interior extensible portion can be extended rearwardly of said motor home, whereby, at a given extended position of said rear interior extensible portion, a balanced position occurs and an entire weight of said rear interior extensible portion is borne only by said fulcrum rollers and, upon further extension, said entire weight is borne also by a resistive force of said upper roller means against said pair of longitudinal upper rails.

2. A motor home as recited in claim 1, wherein said pair of fulcrum rollers are gears, and wherein said pair of longitudinal rails have gear teeth which mesh with said fulcrum rollers, and further comprising reversible motor means for driving said fulcrum roller gears in either direction.

* * * * *